US008090457B2

(12) United States Patent
Cordes et al.

(10) Patent No.: US 8,090,457 B2

(45) Date of Patent: Jan. 3, 2012

(54) METHOD FOR OPERATING A LIGHTING SYSTEM

(75) Inventors: Hartmut Cordes, Bremen (DE); Michael Adenau, Würzburg (DE)

(73) Assignee: MA LIGHTING TECHNOLOGY GmbH, Waldbuttelbrüm (DE)

( * ) Notice: Subject to any disclaimer, the term of this patent is extended or adjusted under 35 U.S.C. 154(b) by 470 days.

(21) Appl. No.: 12/333,648

(22) Filed: Dec. 12, 2008

(65) Prior Publication Data

US 2010/0149797 A1 Jun. 17, 2010

(51) Int. Cl.
*G06F 19/00* (2011.01)

(52) U.S. Cl. .................................... 700/83; 340/870.11

(58) Field of Classification Search .................... 700/17, 700/83; 340/870.11; 703/3, 130; 315/312, 315/291; 362/276

See application file for complete search history.

(56) References Cited

U.S. PATENT DOCUMENTS

| | | | | | |
|---|---|---|---|---|---|
| 5,329,431 | A * | 7/1994 | Taylor et al. | 362/85 |
| 5,406,176 | A * | 4/1995 | Sugden | 315/292 |
| 5,769,527 | A * | 6/1998 | Taylor et al. | 362/85 |
| 6,806,659 | B1 * | 10/2004 | Mueller et al. | 315/295 |
| 7,233,831 | B2 * | 6/2007 | Blackwell | 700/17 |
| 2003/0028260 | A1 * | 2/2003 | Blackwell | 700/18 |
| 2005/0047134 | A1 * | 3/2005 | Mueller et al. | 362/231 |
| 2005/0275626 | A1 * | 12/2005 | Mueller et al. | 345/156 |
| 2006/0001387 | A1 * | 1/2006 | Chansky et al. | 315/315 |
| 2007/0085701 | A1 * | 4/2007 | Walters et al. | 340/870.02 |

* cited by examiner

*Primary Examiner* — Kidest Bahta

(74) *Attorney, Agent, or Firm* — Schwegman, Lundberg & Woessner, P.A.

(57) ABSTRACT

A method for operating a lighting system comprising at least one central control unit and a plurality of lighting devices, including in the lighting devices a positioning sensor system, by which the locations of the lighting devices is determined and wherein location data for describing the locations is transmitted to the central control device from each lighting device comprising a data interface and wherein a stage set database, which describes a stage set model and in which the locations of the various lighting devices in a stage set is stored, is stored in the central control device, the method comprising, a) determining the current locations of the lighting devices by the positioning sensor system in the lighting devices;

b) transferring the current location data from the lighting devices to the central control device;

c) storing the location data in the stage set database.

4 Claims, No Drawings

METHOD FOR OPERATING A LIGHTING SYSTEM

FIELD OF THE INVENTION

The invention relates to a method of operating a lighting system.

BACKGROUND

Known lighting systems, as they are used for lighting theaters, concerts halls, event stages or the like, substantially consist of a central control device and of a plurality of lighting devices, for example spot lights or LED panels.

SUMMARY OF THE INVENTION

A method for operating a lighting system comprising:

at least one central control unit and a plurality of lighting devices, including provision made in the lighting devices for a positioning sensor system operable to determine the locations of the lighting devices and wherein location data for describing the respective location is transmitted to the central control device from each lighting device comprising a data interface, and wherein a stage set database, which describes a stage set model and in which the locations of the various lighting devices in a stage set are stored, is stored in the central control device, comprising the following method;

a) determining the current locations of the lighting devices by the positioning sensor system in the lighting devices;

b) transferring the current location data from the lighting devices to the central control device; and c) storing the location data in the stage set database.

DETAILED DESCRIPTION

In various embodiments of lighting systems, the actual control of the light show is carried out by means of the central control device, wherein the individual lighting devices receive their adjusting commands via suitable data links from the central control device. A stage set database, which describes a stage set model in a virtual manner, is thereby stored in the central control device. The locations of the various lighting devices in a stage set are stored in this stage set database. The term stage set database is thus to be understood in the sense that this database describes the positions of the stage objects, in particular the positions of the lighting devices, for at least on stage. This can take place, for example, in that the stage set database is embodied in the manner of a position data table, wherein the position data of the various stage objects are included in this table.

As a result, the locations or the places of installation of the various lighting devices, respectively, can thus be queried at any time by querying the stage set database in the central control device and the lighting programs can be adapted thereto accordingly.

The operation of central control devices comprising stage set databases, in which the respective locations of the various lighting devices are stored, is problematic in particular when the stage set and the mounting of the various lighting devices resulting therefrom changes frequently. For example, this is the case in particular when the stage show has to be torn down regularly at a venue and when it has to be set up again at a different venue, as it is common for concerts, for example. All of the locations of the lighting device must be re-calibrated anew and must be input into the stage set database after each new installation of the stage set and of the correspondingly changed mounting of the lighting devices. This re-initialization of the stage set database is extraordinarily time-consuming and prone to errors.

Based on this state of the art, it is thus the object of the present invention to propose a new method for operating such a lighting system comprising a central control device and a plurality of lighting devices, which can be re-initialized anew in a quick, reliable and cost-efficient manner.

The basic idea of the method according to the invention consists in that the individual lighting devices are equipped with a positioning sensor system so that the lighting devices can determine their respective locations at any time. After determining the respective locations of the individual lighting devices, these current location data are then transferred from the lighting device to the central control device and the location data are stored there in the stage set database. Due to this automatable positioning procedure, the various locations of the lighting devices can be determined smoothly, rapidly and cost-efficiently after reconstructing the stage set, in particular after changing the venue, and the stage set database can be updated accordingly. The time required to adapt the stage set database to a new venue is shortened considerably and the operations required thereby are limited to an absolute minimum.

It is generally arbitrary how the location data are transmitted from the various lighting devices to the central control device. This can take place, for example, with the use of the cabling which is also used to transfer the control commands from the central control device to the various lighting devices. A wireless data transmission is in particular also possible as an alternative to such a cable-linked data transmission, because the known positioning modules for realizing the positioning sensor system often already operate in a wireless manner.

It is basically arbitrary according to which functional principle the positioning sensor system for determining the respective locations of the lighting devices operates. The locations can be determined in a particularly accurate and simple manner when positioning signals, for example the GPS signals or RFID signals which are emitted by GPS transmitters or RFID transmitters, are received and evaluated for this purpose.

To be able to already use the virtual stage set model prior to the first run of a positioning for the various lighting devices, it is particularly advantageous when the stage set model is stored in the stage set database as a predefined setup. This predefined setup is updated only in response to a request by the user in that the respectively current locations of the various lighting devices are determined and the location data obtained thereby are stored in the stage set database. The design of the central control device for operating the lighting system is generally arbitrary. The use of so-called lighting control consoles, which provide the programmer of a stage show with all of the possibilities for generating, programming and changing lighting sequences, is particularly advantageous.

Typically, at least one lighting program for controlling the lighting device is stored on lighting control consoles during the stage show. If this stage show is to be shown on different stages, it is particularly advantageous when the lighting program includes at least one reference point on the stage, to which the adjusting commands of the lighting program relate. When carrying out the method according to the invention, the locations of the various lighting devices relative to this reference point can then be determined and can be stored in the stage set database. As a result, a change of the lighting program can thus be omitted completely when moving to a new stage, because the corresponding control data of the lighting program change automatically by changing the reference points.

A further simplification results when the lighting program includes a plurality of predefined command sequences, so-called presets. The lighting commands of the command sequences are thereby preferably based on the stage set database and are automatically updated by changing the stage set database so that an adaptation of the presets, in turn, can be omitted when moving the stage show from one venue to another venue.

The method according to the invention provides a further significant advantage in the context of the virtual visualization of the stage set. If the known visualization modules are used for the virtual visualization of the stage set model, the visualization module should preferably access the stage set database. In so doing it is guaranteed that the respectively current locations of the lighting devices are read correctly and are visualized accordingly even in the context of the virtual visualization of the stage set.

The invention claimed is:

1. A method for operating a lighting system comprising:

at least one central control unit and a plurality of lighting devices, including provision made in the lighting devices for a positioning sensor system operable to determine the locations of the lighting devices and wherein location data for describing the locations is transmitted to the central control device from each lighting device comprising a data interface, and wherein a stage set database, which describes a stage set model and in which the locations of the various lighting devices in a stage set are stored, is stored in the central control device, comprising the following method;

a) determining the current locations of the lighting devices by the positioning sensor system in the lighting devices;

b) transferring the current location data from the lighting devices to the central control device; and c) storing the current location data in the stage set database;

including that a lighting control console is used as a central control device, that a lighting program for controlling the lighting devices during a stage show on different stages is stored in the lighting control console, wherein the lighting program includes at least one reference point on the stage, to which the adjusting commands of the lighting program relate and wherein the locations of the various lighting devices relative to the reference point are determined and are stored in the stage set database, further including that the lighting program includes a plurality of predefined command sequences (presets) for the lighting devices, wherein the lighting commands of the command sequences are based on the stage set database and are automatically updated after changing the stage set database, and including that a visualization module for the virtual visualization of the stage set accesses the stage set database and visualizes the stage set in consideration of the current locations of the lighting devices.

2. The method according to claim 1, including that the current location data is transferred wirelessly from the lighting devices to the central control device.

3. The method according to claim 1, including that the positioning sensor system for determining the current location of a lighting device receives and evaluates positioning signals, in particular the GPS signals or RFID signals which are emitted by GPS transmitters or RFID transmitters.

4. The method according to claim 1 including that a stage set model is stored as a predefined setup in the stage set database, wherein the current locations of the various lighting devices are queried upon a request by the user, and wherein the predefined setup of the stage set model is updated by storing the current locations.

* * * * *